United States Patent
Feng et al.

(10) Patent No.: US 10,387,606 B2
(45) Date of Patent: Aug. 20, 2019

(54) VALIDATING A CLOCK TREE DELAY

(71) Applicant: Synopsys, Inc., Mountain View, CA (US)

(72) Inventors: Chunyang Feng, Shanghai (CN); Jianquan Zheng, Shanghai (CN)

(73) Assignee: SYNOPSYS, INC., Mountain View, CA (US)

(*) Notice: Subject to any disclaimer, the term of this patent is extended or adjusted under 35 U.S.C. 154(b) by 172 days.

(21) Appl. No.: 15/145,741

(22) Filed: May 3, 2016

(65) Prior Publication Data
US 2017/0004249 A1    Jan. 5, 2017

(30) Foreign Application Priority Data
Jun. 30, 2015    (CN) .......................... 2015 1 0373202

(51) Int. Cl.
*G06F 17/50*    (2006.01)

(52) U.S. Cl.
CPC ...... *G06F 17/5081* (2013.01); *G06F 2217/62* (2013.01); *G06F 2217/84* (2013.01)

(58) Field of Classification Search
USPC .......................................................... 716/114
See application file for complete search history.

(56) References Cited

U.S. PATENT DOCUMENTS

| | | | |
|---|---|---|---|
| 6,429,714 B1 * | 8/2002 | Schultz | G06F 1/10 327/161 |
| 2010/0296351 A1 * | 11/2010 | Sano | G11C 7/22 365/193 |

* cited by examiner

*Primary Examiner* — Bryce M Aisaka
(74) *Attorney, Agent, or Firm* — Alston & Bird LLP

(57) ABSTRACT

A computer implemented method for validating a clock tree includes estimating a first number of a multitude of first buffers disposed in the clock tree path, and selecting a first scaling coefficient in accordance with the first number. The computer implemented method further includes scaling a first delay associated with the multitude of first buffers in accordance with the selected first scaling coefficient, and generating a second multitude of second buffers disposed in the clock tree path defined by a second number greater than the first number.

39 Claims, 9 Drawing Sheets

VALIDATING A CLOCK TREE DELAY

CROSS REFERENCE TO RELATED APPLICATIONS

This application claims the benefit of priority to Chinese Patent Application No. 201510373202.5, filed with the Chinese Patent Office on Jun. 30, 2015 and entitled "VALIDATING A CLOCK TREE DELAY", the content of which is incorporated herein by reference in its entirety.

BACKGROUND

The present invention relates generally to a method and system for computer aided design (CAD) of integrated circuits and in particular to timing validation of clock tree delays.

Integrated circuit (IC) timing validation has adapted to increasing IC density and complexity. Static timing analysis (STA) is often utilized for performing timing analysis towards validation and optimization of synchronous circuit designs. STA validation allows the designer to make modifications to improve the reliability, efficiency, and/or speed of the circuit design. Design margin or pessimism is generally incorporated into STA so that variations in modeling, design and manufacturing of the IC are taken into account in the design by providing extra time before signals in the IC change in order to guarantee the proper functioning of the IC. Over-design or excess pessimism may cause the IC to have slow speed characteristics, miss speed targets, overly complicate the design, and/or delay finishing the design on time.

Clock trees are a type of circuit path that presents special design challenges because one clock-driver circuit block disposed at the root of the tree may be required to output or source a signal that drives the receiving inputs or clock sinks of thousands of other logic circuit blocks disposed at the leaves of the tree sometimes across the whole IC. In one CAD flow, the clock tree is synthesized automatically including placing a multitude of buffer circuit blocks, hereinafter also referred to as "buffers," along the clock tree to assist driving the large capacitive load presented at the root by the combination of the long wire lengths and the multitude of clock sinks at the leaves.

Path based analysis (PBA) is a type of STA used to calculate delays beginning at the input and tracing a path to the output of a circuit path. PBA CAD computation may be slow in analyzing circuit designs as each circuit path is analyzed separately. For example, only the slews of the input pins along a given circuit path are considered in PBA analysis. PBA is generally used for optimization when the circuit design is nearly completed due to the exhaustive nature of PBA and the amount of computational time needed to perform PBA. On-chip-variation (OCV) and advanced on chip variation (AOCV) analysis are types of PBA that comprehends statistical variations in logic circuit blocks created during advanced IC manufacturing technology in contrast to systemic variations such as for example slow circuit blocks due to manufacturing the IC with atypically large transistor gate length sometimes occurring in both advanced as well as older generations of IC technology.

AOCV is usually performed on clock trees after clock tree synthesis (CTS) for the reasons described above and may result in excess pessimism in the timing. Thus, there is a need for a better CAD flow that performs AOCV before CTS to reduce excess pessimism in the timing.

SUMMARY

In accordance with one embodiment of the present invention, a computer implemented method for validating a clock tree including estimating a first number of a multitude of first buffers disposed in the clock tree path, and selecting a first scaling coefficient in accordance with the first number. The computer implemented method further includes scaling a first delay associated with the multitude of first buffers in accordance with the selected first scaling coefficient, and generating a second multitude of second buffers disposed in the clock tree path defined by a second number greater than the first number.

According to one embodiment, generating the second multitude of second buffers is performed after scaling the first delay. According to one embodiment, the multitude of first buffers is coupled between a first block generating a clock signal in the clock tree and a third number of a multitude of second blocks receiving the clock signal.

According to one embodiment, estimating the first number is in accordance with a logarithmic function of the third number. According to one embodiment, estimating the first number includes receiving, before estimating the first number, a netlist for the clock tree, a fan-out constraint, and a capacitance constraint. The computer implemented method further includes computing a first fan-out in accordance with the netlist, the fan-out constraint, and the capacitance constraint, and determining the first number in accordance with the logarithm of the third number, the logarithm being to a base equal to the first fan-out.

According to one embodiment, each one of the multitude of first buffers is associated with a substantially equal delay time. According to one embodiment, the multitude of second buffers includes, a third buffer having a first delay time, and a fourth buffer having a second delay time different from the first delay time.

According to one embodiment, the method further includes selecting, after scaling the first delay, a second scaling coefficient smaller than the first scaling coefficient in accordance with the second number, and scaling a second delay associated with the multitude of second buffers in accordance with the selected second scaling coefficient. According to one embodiment, selecting the first scaling coefficient includes receiving a scaling table including a multitude of scaling coefficients each associated with a different one of a multitude of logic depths including the first number, and indexing among the multitude of logic depths using the first number to select the first scaling coefficient that is associated with the first number.

In accordance with one embodiment of the present invention, a computer implemented method for validating a clock tree includes estimating a first number of a multitude of first buffers disposed in the clock tree path. The multitude of first buffers is coupled between a first block generating a clock signal in the clock tree and a second number of a multitude of second blocks receiving the clock signal. Estimating the first number is in accordance with a logarithmic function of the second number. The computer-implemented method further includes selecting a first scaling coefficient in accordance with the first number, and scaling a first delay associated with the multitude of first buffers in accordance with the selected first scaling coefficient.

According to one embodiment, estimating the first number further includes receiving, before estimating the first number, a netlist for the clock tree, a fan-out constraint, and a capacitance constraint. The computer-implemented method further includes computing a first fan-out in accordance with the netlist, the fan-out constraint, and the capacitance constraint, and determining the first number in accordance with the logarithm of the third number, the logarithm being to a base equal to the first fan-out.

According to one embodiment, selecting the first scaling coefficient further includes receiving a scaling table including a multitude of scaling coefficients each associated with a different one of a multitude of logic depths including the first number. The computer-implemented method further includes indexing among the multitude of logic depths using the first number to select the first scaling coefficient that is associated with the first number.

In accordance with one embodiment of the present invention, a system for validating a clock tree is configured to estimate a first number of a multitude of first buffers disposed in the clock tree path, and select a first scaling coefficient in accordance with the first number. The system is further configured to scale a first delay associated with the multitude of first buffers in accordance with the selected first scaling coefficient, and generate a second multitude of second buffers disposed in the clock tree path defined by a second number greater than the first number.

According to one embodiment, the system is further configured to generate the second multitude of second buffers after scaling the first delay. According to one embodiment, the multitude of first buffers is coupled between a first block that generates a clock signal in the clock tree and a third number of a multitude of second blocks that receive the clock signal.

According to one embodiment, the system is further configured to estimate the first number in accordance with a logarithmic function of the third number. According to one embodiment, the system is further configured to receive, before estimating the first number, a netlist for the clock tree, a fan-out constraint, and a capacitance constraint. The system is further configured to compute a first fan-out in accordance with the netlist, the fan-out constraint, and the capacitance constraint, and determine the first number in accordance with the logarithm of the third number, the logarithm being to a base equal to the first fan-out.

According to one embodiment, the system is further configured to select, after the first delay is scaled, a second scaling coefficient smaller than the first scaling coefficient in accordance with the second number. The system is further configured to scale a second delay associated with the multitude of second buffers in accordance with the selected second scaling coefficient. According to one embodiment, the system is further configured to receive a scaling table including a multitude of scaling coefficients each associated with a different one of a multitude of logic depths including the first number, and index among the multitude of logic depths using the first number to select the first scaling coefficient that is associated with the first number.

In accordance with one embodiment of the present invention, a system for validating a clock tree is configured to estimate a first number of a multitude of first buffers disposed in the clock tree path. The multitude of first buffers is coupled between a first block generating a clock signal in the clock tree and a second number of a multitude of second blocks receiving the clock signal. The first number is estimated in accordance with a logarithmic function of the second number. The system is further configured to select a first scaling coefficient in accordance with the first number, and scale a first delay associated with the multitude of first buffers in accordance with the selected first scaling coefficient.

According to one embodiment, the system is further configured to receive, before the first number is estimated, a netlist for the clock tree, a fan-out constraint, and a capacitance constraint. The system is further configured to compute a first fan-out in accordance with the netlist, the fan-out constraint, and the capacitance constraint, and determine the first number in accordance with the logarithm of the third number, the logarithm being to a base equal to the first fan-out. According to one embodiment, the system is further configured to receive a scaling table including a multitude of scaling coefficients each associated with a different one of a multitude of logic depths including the first number, and index among the multitude of logic depths using the first number to select the first scaling coefficient that is associated with the first number.

In accordance with one embodiment of the present invention, a non-transitory computer-readable storage medium comprising instructions, which when executed by a computer, cause the computer to estimate a first number of a multitude of first buffers disposed in the clock tree path, and select a first scaling coefficient in accordance with the first number. The instructions further cause the computer to scale a first delay associated with the multitude of first buffers in accordance with the selected first scaling coefficient, and generate a second multitude of second buffers disposed in the clock tree path defined by a second number greater than the first number.

According to one embodiment, the instructions further cause the computer to generate the second multitude of second buffers after scaling the first delay. According to one embodiment, the multitude of first buffers is coupled between a first block that generates a clock signal in the clock tree and a third number of a multitude of second blocks that receive the clock signal.

According to one embodiment, the instructions further cause the computer to estimate the first number in accordance with a logarithmic function of the third number. According to one embodiment, the instructions further cause the computer to receive, before estimating the first number, a netlist for the clock tree, a fan-out constraint, and a capacitance constraint. The instructions further cause the computer to compute a first fan-out in accordance with the netlist, the fan-out constraint, and the capacitance constraint. The instructions further cause the computer to determine the first number in accordance with the logarithm of the third number, the logarithm being to a base equal to the first fan-out.

According to one embodiment, the instructions further cause the computer to select, after the first delay is scaled, a second scaling coefficient smaller than the first scaling coefficient in accordance with the second number, and scale a second delay associated with the multitude of second buffers in accordance with the selected second scaling coefficient. According to one embodiment, the instructions further cause the computer to receive a scaling table including a multitude of scaling coefficients each associated with a different one of a multitude of logic depths including the first number, and index among the multitude of logic depths using the first number to select the first scaling coefficient that is associated with the first number.

In accordance with one embodiment of the present invention, a non-transitory computer-readable storage medium comprising instructions, which when executed by a computer, cause the computer to estimate a first number of a multitude of first buffers disposed in the clock tree path. The multitude of first buffers is coupled between a first block generating a clock signal in the clock tree and a second number of a multitude of second blocks receiving the clock signal. The first number is estimated in accordance with a logarithmic function of the second number. The instructions further cause the computer to select a first scaling coefficient in accordance with the first number, and scale a first delay associated with the multitude of first buffers in accordance with the selected first scaling coefficient.

According to one embodiment, the instructions further cause the computer to receive, before the first number is estimated, a netlist for the clock tree, a fan-out constraint, and a capacitance constraint. The instructions further cause the computer to compute a first fan-out in accordance with the netlist, the fan-out constraint, and the capacitance constraint. The instructions further cause the computer to determine the first number in accordance with the logarithm of the third number, the logarithm being to a base equal to the first fan-out. According to one embodiment, the instructions further cause the computer to receive a scaling table including a multitude of scaling coefficients each associated with a different one of a multitude of logic depths including the first number, and index among the multitude of logic depths using the first number to select the first scaling coefficient that is associated with the first number.

A better understanding of the nature and advantages of the embodiments of the present invention may be gained with reference to the following detailed description and the accompanying drawings.

DETAILED DESCRIPTION

Figure 1:
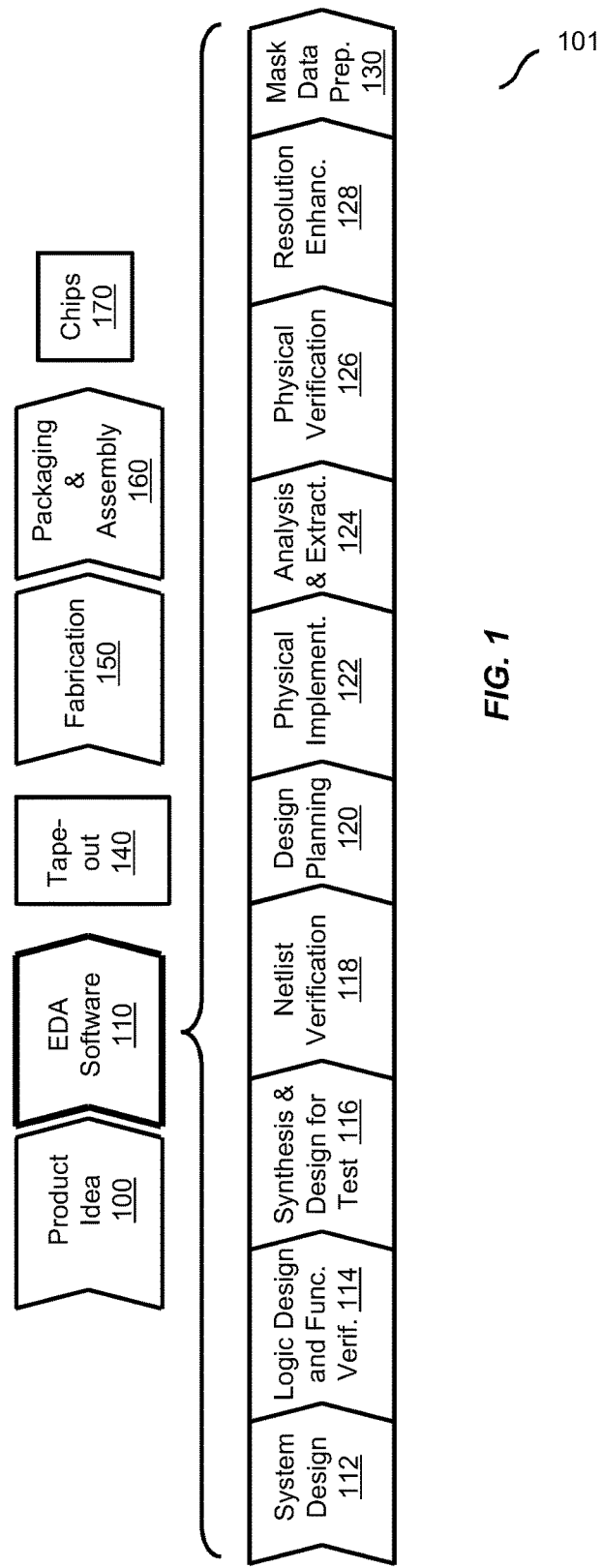
FIG. 1 depicts simplified exemplary steps in the design and fabrication of an integrated circuit that may use embodiments of the present invention.

FIG. 1 depicts various steps 101 in the design and fabrication of an integrated circuit. The process starts with a product idea 100, which may be realized using Electronic Design Automation (EDA) software 110. Chips 170 can be produced from the finalized design by performing fabrication 150 and packaging and assembly 160 steps. An exemplary design flow that uses EDA software 110 is described below for illustration purposes only. For example, an actual integrated circuit design may require a designer to perform the design flow steps in a different sequence than the sequence described below.

In the system design 112, a designer describes the functionality to be implemented. The designer can also perform what-if planning to refine the functionality and to check costs. Further, hardware-software architecture partitioning can occur at this step. In the design and functional verification 114, a Hardware Description Language (HDL) design may be created and checked for functional accuracy.

In the synthesis and design 116, the HDL code can be translated to a netlist, which can be optimized for the target technology. Further, tests may be designed and implemented to check the finished chips. In the netlist verification 118, the netlist may be checked for compliance with timing constraints and for correspondence with the HDL code. In the design planning 120, an overall floor plan for the chip can be constructed and analyzed for timing and top-level routing. Next, in the physical implementation 122, placement and routing may be performed.

In the analysis and extraction 124, the circuit functionality may be verified at a transistor level. In the physical verification 126, the design may be checked to correct any functional, manufacturing, electrical, or lithographic issues. In the resolution enhancement 128, geometric manipulations may be performed on the layout to improve manufacturability of the design. Finally, in the mask data preparation 130, the design can be taped-out 140 for production of masks to produce finished chips.

Figure 2:
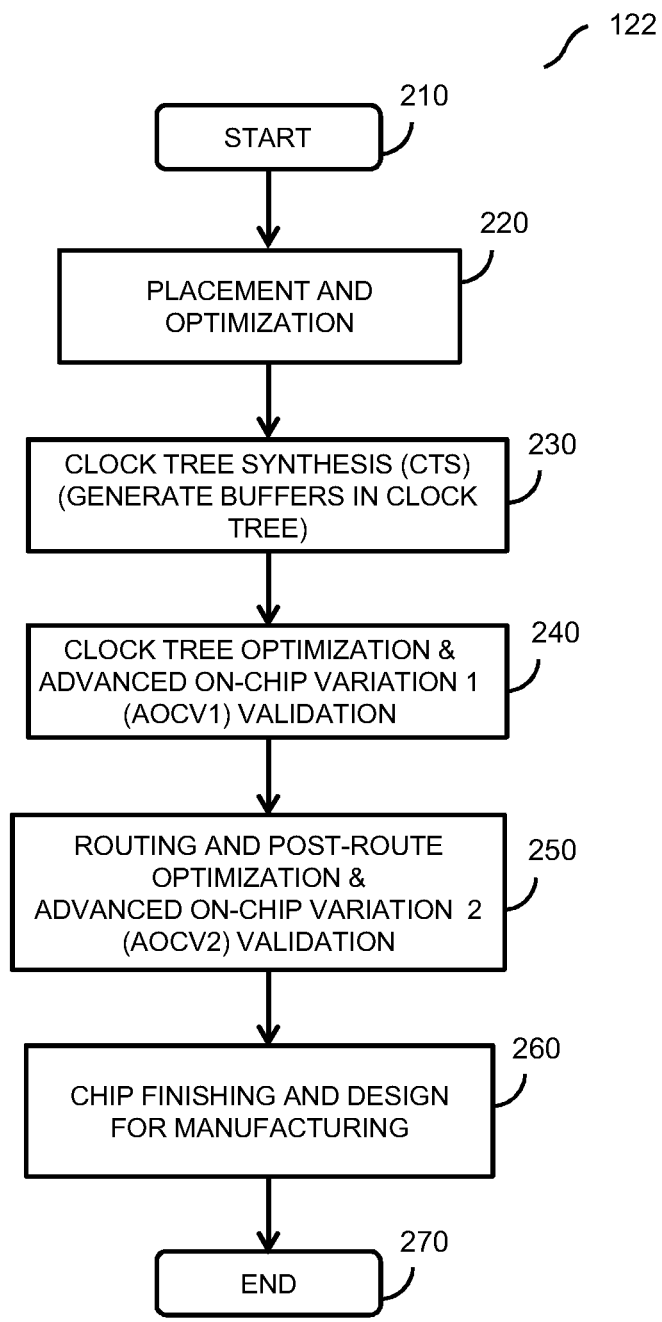
FIG. 2 depicts simplified exemplary steps in the physical implementation step depicted in FIG. 1.

FIG. 2 depicts simplified exemplary steps in the physical implementation step 122 depicted in FIG. 1. Referring to FIG. 2, physical implementation step 122 starts 210 with placement and optimization 220 that may be an iterative process using enhanced placement and synthesis CAD technologies. Placement and optimization 220 generates legalized placement for circuit layout cells, i.e. the geometries to be patterned into photomasks representing structures to be patterned into IC circuit elements and interconnections on a semiconductor wafer, and an optimized design in accordance with the design netlist, floor plan, and design rules. Placement and optimization 220 functionality may optimize power, recover area for placement, minimize layout congestion, and minimize timing and design rule violations. On-chip-variation (OCV) timing analysis may be used after placement during placement and optimization 220 to minimize the timing violations, as will be explained in examples below.

Clock tree synthesis (CTS) 204 may be a process to construct each clock tree in the netlist and layout of the design. Each clock may be constructed such that a clock source or driver at the root of the clock tree may be able to drive possibly thousands of clocked elements at the leaves of the clock tree via direct interconnections and other circuit elements of the clock tree. CTS may be accomplished, in part, by automatically generating buffers along the clock tree paths as needed to meet timing constraints using some of the available layout resources. Clock tree synthesis also minimizes clock tree skew and clock insertion delay, i.e. the clock signal delay from the clock source at the root of the clock tree to a clock sink at a leaf of the clock tree.

Next, clock tree optimization & AOCV1 validation 240 may perform clock tree and data path optimization for timing improvement. Clock tree optimization may improve both clock skew and clock insertion delay by performing buffer sizing, buffer relocation, gate sizing, gate relocation, voltage level adjustment, placement reconfiguration, signal timing delay introduction, dummy load insertion, and balancing of inter-clock delays. AOCV1 may be performed on the synthesized clock tree with the buffers already in place and may be used, in part, to accomplish the above optimization either automatically using CAD tools or manually, e.g. using designer intervention to reduce timing pessimism. AOCV1 will be explained in detail in examples below.

Routing and post-route optimization & AOCV2 validation 250 performs global signal routing, track assignment, detail routing, topological optimization, and engineering change order (ECO) routing. The results of the AOCV2 in step 250 may be used to reduce post-routing timing pessimism. Chip finishing and design for manufacturing 260 may perform design for yield capabilities that may be applied throughout the various stages of the design flow to address process design issues encountered during chip manufacturing. That ends 270 physical implementation step 122.

Figure 3:
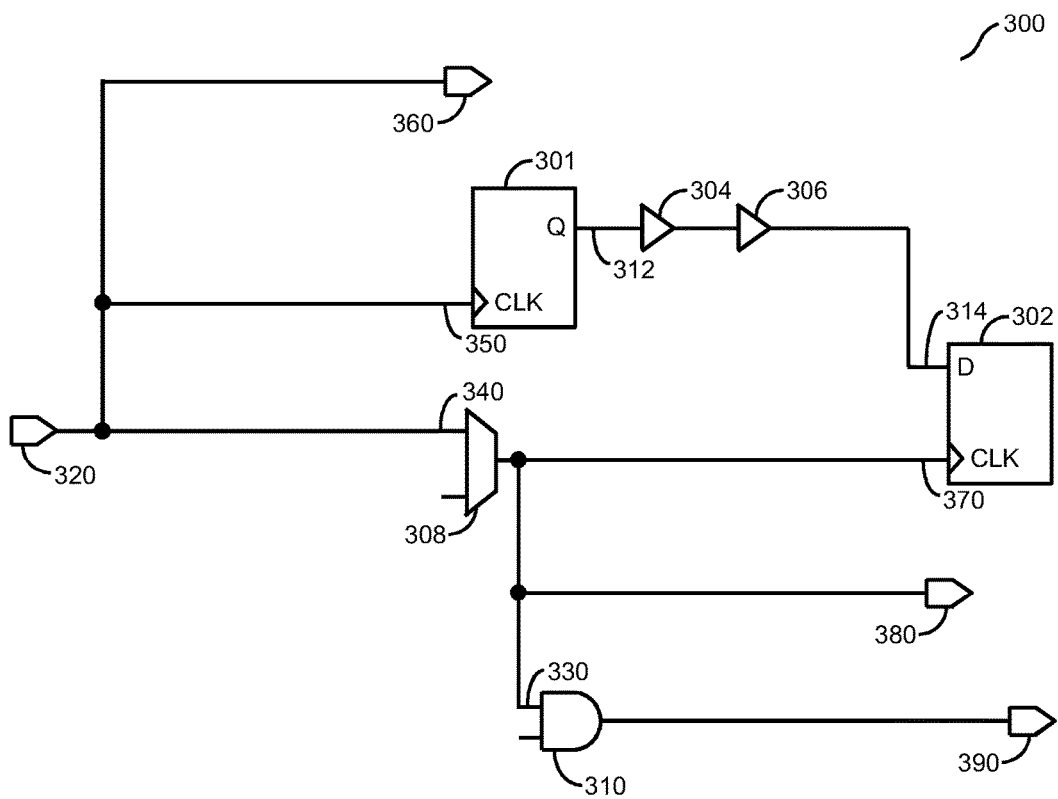
FIG. 3 depicts a simplified exemplary schematic of a clock tree and data path of an integrated circuit before clock tree synthesis (CTS) that may be used by embodiments of the present invention.

FIG. 3 depicts a simplified exemplary schematic of a clock tree and data path 300 of an integrated circuit before clock tree synthesis (CTS) 230 that may be acted upon by embodiments of the present invention. Clock tree and data path 300 may include a pair of flip-flops 301, 302, hereinafter also respectively referred to as FF1, FF2, a pair of buffer inverters 304, 306, hereinafter also respectively referred to as U 304, U 306, which are included in a data path, a multiplexer 308, hereinafter also referred to as MUX 308, and a AND gate 310. A data path may include the Q output 312 of FF1, hereinafter also referred to as FF1/Q 312, which drives the D input 314 of FF2, hereinafter also referred to as FF2/D 314, via the serially connected pair of buffer inverters 304, 306.

A clock tree may include a root of clock tree 320 driven by a clock source (not shown), hereinafter also referred to as Clk 320, which is connected directly by a net CKA to a MUX input 340, a clock (CLK) input 350 of FF1, hereinafter also referred to as FF1/CLK 350, and a clock sink 360. In the following examples, clock sink 360 may represent a multitude of one thousand clock sinks disposed at various different leaves of the clock tree on net CKA but represented here as a single lumped circuit at clock sink 360.

The clock tree may further include the MUX, whose output drives a net MXA directly connected to a clock (CLK) input 370 of FF2, hereinafter also referred to as FF2/CLK 370, a MUX output 330 driving an input of AND gate 310, and a clock sink 380, which in the following examples represents a multitude of five thousand clock sinks disposed at various different leaves of the clock tree on net MXA but represented here as a single lumped circuit at clock sink 380. The clock tree may further include AND gate 310, whose output drives a net MXB directly connected to a clock sink 390, which in the following examples represents a multitude of six thousand clock sinks disposed at various different leaves of the clock tree on net MXB but represented here as a single lumped circuit at clock sink 390.

A net may be defined by directly connected conductors such as metal, polysilicon, or heavily doped diffusion, i.e. directly connected wires, that directly connect elements of a circuit specified in the netlist without any intervening transistors, gates, or other netlist specified circuit elements. In contrast, a path may include portions of one or more nets connecting a signal source, such as for example Clk 320, to a signal sink receiving the signal, such as for example FF1/CLK 350 or FF2/CLK 370 and may or may not include one or more intervening transistors, gates, or other netlist specified circuit elements. For example, the clock tree may include the path between Clk 320 and FF2/CLK 370 that includes MUX 308 connected via portions of nets CKA and MXA, and may also be represented symbolically as Clk 320→MUX 308→FF2/CLK 370.

For example, the clock tree may further include the path between Clk 320 and FF1/CLK 350, which is a direct connection via a portion of net CKA, and may also be represented symbolically as Clk 320→FF1/CLK 350.

The clock tree may include a multitude of paths that connect root of clock tree 320 or Clk 320 to clock sinks at leaves of the clock tree such as FF1/CLK 350, clock sink 360, FF2/CLK 370, clock sink 380, and clock sink 390. Therefore, the many paths that the clock tree includes may be a challenge for design and timing analysis.

Referring to FIG. 2 and FIG. 3, before CTS 230, the placement of flip-flops 301, 302, pair of buffer inverters 304, 306, MUX 308, and AND gate 310 and sizing of some of their output drivers may be optimized to meet timing requirements after timing is simulated during placement and optimization 220. The earlier the design is optimized during the physical implementation 122 flow, the better the design outcome, because design changes are generally more difficult to accomplish in the later stages of the flow when layout resources are less readily available.

Static timing analysis (STA) may be used to analyze the IC design to see if timing requirements are met, and if not, flags the error paths. Using an STA timing example based on FIG. 3, the data arriving at FF2/D 314 comes from FF1/Q 312. FF1 is clocked by Clk 320. The clock arriving at FF2/CLK 370 is also from Clk 320. Therefore, Clk 320 may be defined as a common point and used as a starting reference for timing analysis. The data to FF2/D 314 is launched via the path between Clk 320 and FF2/D 314, and may be called a "launch path," which may also be represented symbolically as Clk 320→FF1/CLK 350→FF1/Q 312→U 304→U 306→FF2/D 314.

The data arriving at the FF2/D pin may be captured by the path between Clk 320 and FF2/CLK 370, and may be called a "capture path," which may also be represented symbolically as Clk 320→MUX 308→FF2/CLK 370.

There are at least two timing requirements that the delay of the launch path and the delay of capture path should meet: an early arrival timing requirement and a late arrival timing requirement. The early arrival requirement defines that the arrival of data with respect to the launch path cannot be earlier than the arrival of the clock signal on the capture path plus the hold time requirement of FF2 302. In other words, Launch path early arrival>capture path arrival+hold time.

Otherwise, the new data may overwrite the old data on FF2/D 314, causing the clock signal arriving at FF2/CLK 370 to latch the wrong data. A timing margin called hold slack may be defined by hold slack=launch path early arrival−(capture path arrival+hold time).

There is no timing violation if hold slack >0.

The late arrival requirement requires that the arrival of data with respect to the launch path cannot be later than the arrival of the next cycle of the clock signal on the capture path minus the setup time requirement of FF2 302. In other words, Launch path late arrival<Clock period+capture path arrival−setup time Otherwise, the next clock cycle may not latch the data on FF2/D 314 in time. The late arrival requirement will be discussed next.

For purposes of this STA example, the delay, setup, and hold time assumptions associated with the exemplary elements depicted in FIG. 3 are given in Table 1 below.

TABLE 1

| Element | Time (ns) and type |
| --- | --- |
| FF1/CLK 350 → FF1/Q 312 | 0.5 delay |
| U 304 | 0.11 delay |
| U 306 | 0.11 delay |
| MUX 308 | 1.0 delay |
| FF2/CLK 370→ FF2/D 314 | 0.21 setup |

Figure 4:
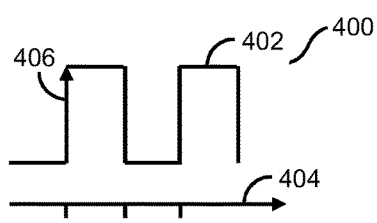
FIG. 4 depicts a simplified exemplary timing and waveform diagram representing the clock signal associated with a launch-path timing analysis that may be used by embodiments of the present invention.

FIG. 4 depicts a simplified exemplary timing and waveform diagram 400 representing a clock signal 402 associated with a launch-path timing analysis that may be used by embodiments of the present invention. FIG. 4 also depicts a time scale 404 for these examples. Referring simultaneously to FIG. 3, FIG. 4, and Table 1, clock signal 402 appears at Clk 320 at time 0. The rising edge 406 of clock signal 402 appears at FF1/CLK 350 at zero nanoseconds (ns) because there are no other circuit elements between Clk 320 FF1/CLK 350 and launches the data path at FF1/Q 312 after a delay time of 0.5 ns due to the delays in FF1. Each of the pair of buffer inverters 304, 306 contribute 0.11 ns of launch path delay. The delay for the launch path may be the sum of the delays associated with each element in the launch path Clk 320→FF1/CLK 350→FF1/Q 312→U 304→U 306→FF2/D 314, and may be similarly provided by table 1 and are respectively 0+0.5+0.11+0.11=0.72 ns.

Figure 5:
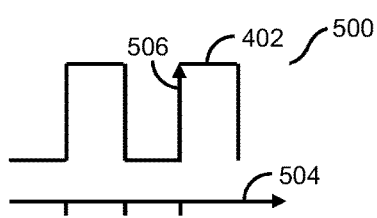
FIG. 5 depicts a simplified exemplary timing and waveform diagram representing the clock signal depicted in FIG. 4 and further associated with a setup time that may be used by embodiments of the present invention.

For the late arrival requirement, which includes the setup time of FF2, the delay of the launch path may be compared with the capture path delay of the next clock cycle minus the setup time requirement of FF2. FIG. 5 depicts a simplified exemplary timing and waveform diagram 500 representing the clock signal 402 depicted in FIG. 4 and further associated with a setup time for FF2 that may be used by embodiments of the present invention. Continuing the same example and referring simultaneously to FIG. 3, FIG. 5, and Table 1, the second rising edge 506 or next clock cycle of clock signal 402 appears at FF2/CLK 370 after a clock period of four nanoseconds after time zero plus the capture path delay due to MUX 308 of 1 ns and subtracting the 0.21 ns setup time of FF2/CLK 370→FF2/D 314 gives:

4+1.0−0.21=4.79 ns, which must be greater than the launch path delay, according to the late arrival requirement. As calculated above, the delay on the launch path is 0.72 ns, which is smaller than the 4.79 ns satisfying the late arrival requirement. A type of timing margin, setup slack time, may be defined as setup slack=clock period+capture path arrival−setup time−launch path late arrival.

In this example, there is a timing margin or setup slack of 4.79−0.72=4.07 ns.

There is no timing violation if setup slack >0, which is satisfied in this example.

On-Chip-Variations (OCV) timing analysis may comprehend some of the statistical factors during manufacturing that can affect the timing. OCV may increase or decrease signal delay. Traditionally, OCV may be modeled by two numbers called "derate" values. One derate value is larger than one and the other derate value is smaller than one. The larger-than-one derate value is called "derate for late path" and the smaller-than-one derate value is called "derate for early path." To deal with worst-case timing situations, wherever applicable, the delay value on the late path may be multiplied by the "derate for late path" value >1, while the delay values on the early path may be multiplied by the "derate for early path" value <1.

It is noted that the setup, hold and clock cycle times, which are constraints unrelated to statistical circuit variation, are not multiplied by the derate value in OCV analysis, in contrast to systemic timing analysis approaches. In other words, OCV derates circuit elements when there may be many such elements in a path that randomly vary in speed characteristics, in contrast to systemic speed variations such as gate Z/L, which effects all elements including the clock period.

Using the previous examples, applying an OCV "derate for late path" value such as for example 1.2 to the previously calculated launch path delay provides 0*1.2+0.50*1.2+0.11*1.2+0.11*1.2=0.864 ns.

Using the previous examples, applying an OCV "derate for early path" value such as for example 0.8 to the previously calculated delay on the capture path provides 4+1.0*0.8−0.21=4.59 ns The setup slack with OCV is now given by 4.59−0.864=3.726 ns, which still meets the late arrival and slack requirements. However, the setup slack is reduced from 4.07 ns previously without OCV to 3.726 ns with OCV. In other words, OCV timing reduces the pessimism While the OCV approach of multiplying delays by only the "derate for late path" and "derate for early path" values may work satisfactorily for 130-nm and 90-nm technology designs, OCV may add excessive and pessimistic margins to designs at smaller geometries, and may result in over-design, e.g. excess slack, design margin, or pessimism, reduced design performance, and longer time to design cycle completion.

Advanced On-Chip Variation (AOCV) analysis or validation, used in designs for deep-submicron technologies, provides a better and more accurate solution than OCV that naturally extends OCV analysis to deliver an improved method of adding variation-related margins in the design. AOCV uses intelligent techniques for context-specific derating that derate values as a function of logic depth of each path being analyzed, instead of a single pair of global derate value, thus reducing the excessive design margins and leading to fewer timing violations. Logic depth of a path is associated with the number of circuit elements or layout cells in that path. AOCV represents a more realistic and practical method of margining than OCV, and may alleviate the concerns of overdesign, reduced design performance, and longer timing closure cycles because of too much margin or pessimism requiring more design changes to clear the more numerous timing errors from OCV timing analysis.

Roughly speaking, AOCV may assume that random statistical variation is inversely proportional to the logic depth of the path being analyzed. AOCV is based on statistical analysis, which shows that deeper paths are less affected by random variations—because the contributory effects are random, it is highly unlikely that all cells in a deep path are simultaneously becoming fast or slow. In other words, the more the number of cells a path has, the less susceptible the path is to timing variation due to OCV effects. Thus, AOCV computes the path depth by counting the number of cells in the path being analyzed and selects an appropriate derate value from a pre-characterized AOCV derating table that may be received by the simulator.

Table 2 below depicts an example of an AOCV derate or scaling table and indicates AOCV path depths for launch and capture paths are determined based on the path depth. For example, if the path includes one or more buffers, the scaling table 2 includes a multitude of derate values or scaling coefficients each associated with a different one of a multitude of logic or cell depths ranging from one to fifteen cells associated with a different one of a multitude of scaling values between 1.2 and 1.08. The higher the logic depth is, the lower is the variable derating or scaling value.

TABLE 2

| Logic depth (number of elements) | 1 | 2 | 3 | 4 | 5 | 15 |
|---|---|---|---|---|---|---|
| Variable derate value | 1.2 | 1.16 | 1.14 | 1.13 | 1.12 | 1.08 |

Because the AOCV timing simulation may index among the multitude of logic depths in the scaling table for each path, AOCV may require more computer resources than the OCV technique. Therefore, AOCV may be used after CTS when the netlist and cell layout of the design are more completed, while OCV may in some cases be used before CTS. The design example described above will be continued after CTS is executed.

Figure 6:
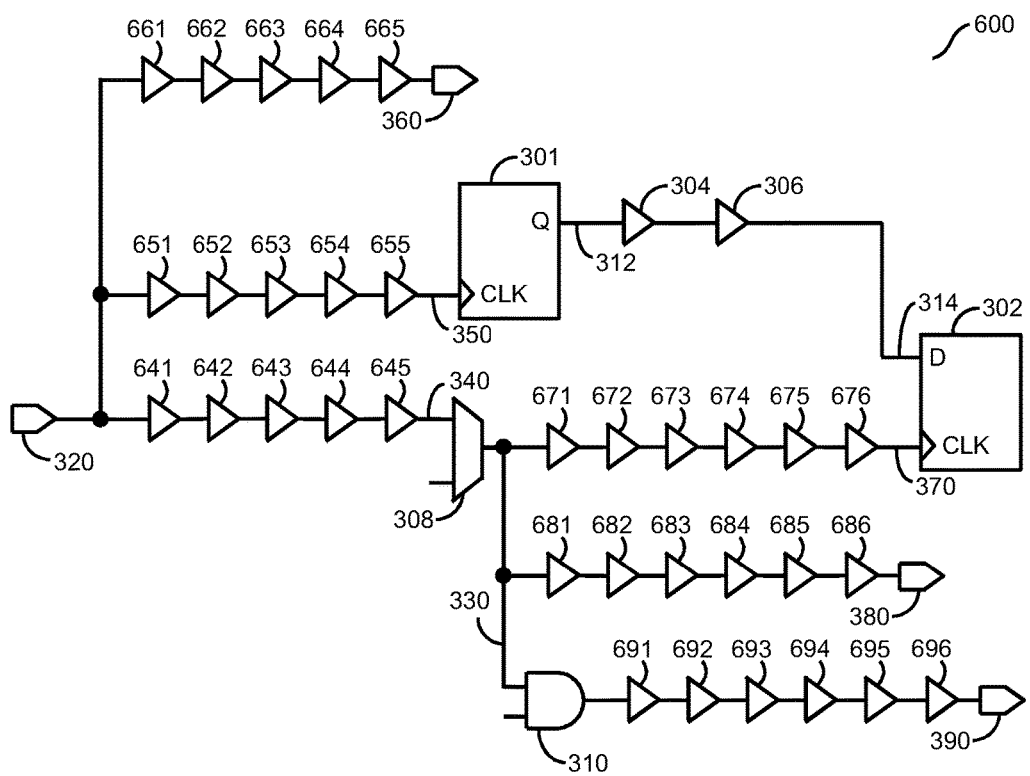
FIG. 6 depicts the simplified exemplary schematic depicted in FIG. 3 after clock tree synthesis (CTS) that may be used by embodiments of the present invention.

FIG. 6 depicts the simplified exemplary schematic 600 depicted in FIG. 3 after CTS 230 that may be used by embodiments of the present invention. FIG. 6 includes the same elements and functions as FIG. 3 except for the following differences. Schematic 600 depicted in FIG. 6 may further include additional serially connected clock tree buffers 641-645 coupled between Clk 320 and MUX input 340, serially connected clock tree buffers 651-655 coupled between Clk 320 and FF1/CLK 350, and serially connected clock tree buffers 661-665 coupled between Clk 320 and clock sink 360. Schematic 600 may further include additional serially connected clock tree buffers 671-676 coupled between MUX output 330 and FF2/CLK 370, serially connected clock tree buffers 681-686 coupled between MUX output 330 and clock sink 380, and serially connected clock tree buffers 691-696 coupled between the output of AND gate 310 and clock sink 390.

Returning to the previous AOCV timing example and referring simultaneously to FIG. 2, FIG. 6 and Table 2, exemplary clock tree buffers 641-645, 651-655, 661-665, 671-676, 681-686, 691-696 may be added to the netlist and layout design during CTS 230 referenced in FIG. 2. As previously depicted in FIG. 6, the logic depth is the level of logic branching off from the Common Path Pessimism Reduction (CRPR) common point disposed at Clk 320, hereinafter also referred to as the common path. AOCV assumes that the timing variation in the common path is zero because the launch and capture signals in the common path passing through the CRPR common point are the same signals. Therefore, by default, AOCV does not include net or cell objects in the common path for AOCV depth calculations.

A separate logic depth value may be used in the launching path and the capturing path calculation based on the logic connectivity of schematic 600 after CTS. Therefore, for the example depicted in FIG. 6, the launch path depth from Clk 320 to FF2/D 314 is eight, that is, the five clock tree buffers 651-655 plus the one FF1, plus the pair of buffer inverters 304, 306 without counting FF2. The capture path depth from Clk 320 to FF2/CLK 370 is twelve, that is, the five clock tree buffers 641-645 plus the one MUX 308, plus the six clock tree buffers 671-676 without counting FF2. The launch path depth value of eight and the capture path depth value of twelve described above are used as indices to the derate table to select the appropriate derate values.

In this example, the indexing for the launch path logic depth equal to eight uses the launch path derate value for a logic depth of five to select a variable derate value of 1.12 because the launch path logic depth of eight is not listed in Table 2, which requires a logic depth equal to or greater than fifteen for the next lower scaling value of 1.08 to be selected. Similarly, the indexing for the capture path depth of twelve uses the variable derate value for a logic depth of five to select a variable derate value of 1.12, again for the same reason as described above for the launch path variable derate value.

Then in this example, the AOCV variable derate value of 1.12 is applied to the cell timing delays as a multiplicative factor giving for the launch path delay 0*1.12+0.50*1.12+0.11*1.12+0.11*1.12=0.8064 ns, and for the capture path delay 4+1.0*0.8−0.21=4.59 ns.

The setup slack with AOCV for post CTS circuit 600 is given by 4.59−0.8064=3.7836 ns, which still meets the late arrival and slack requirements. In contrast to the above example, for other circuit examples there may be two different variable derate values used for the launch and capture paths respectively.

Figure 7:
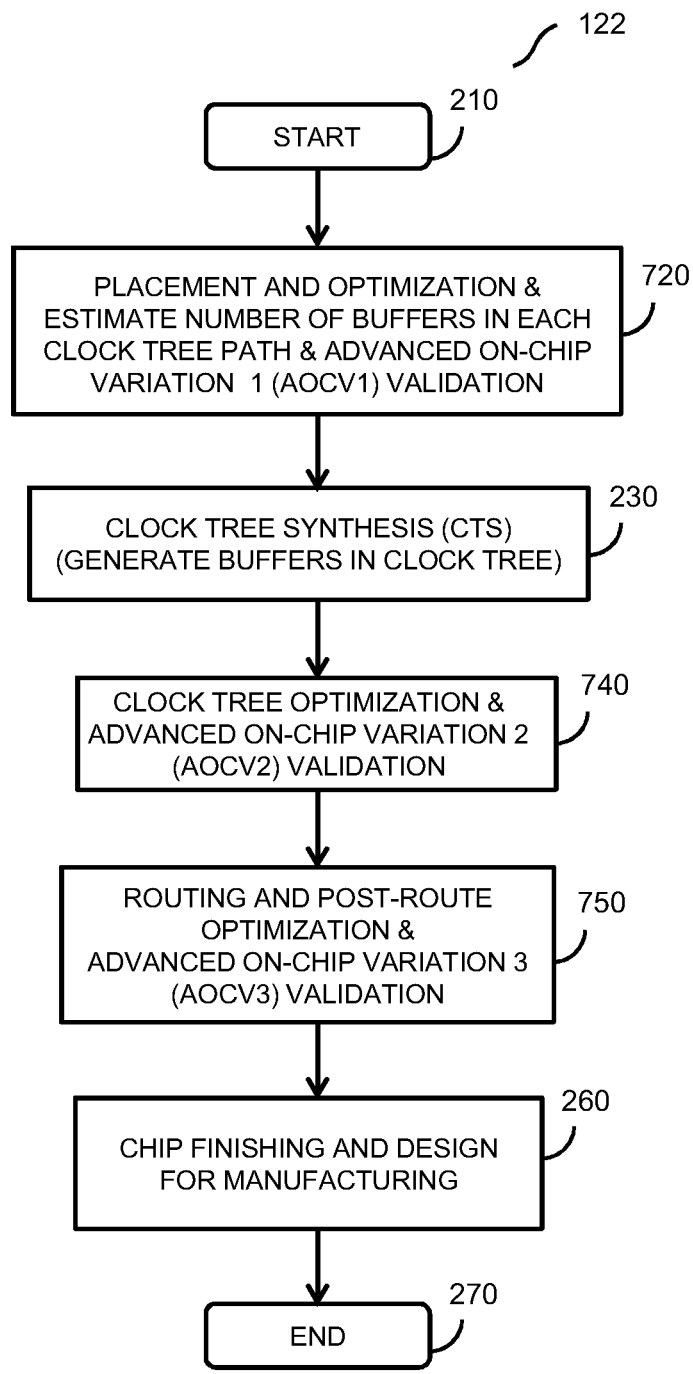
FIG. 7 depicts simplified exemplary steps in the physical implementation step depicted in FIG. 1, in accordance with one embodiment of the present invention.

FIG. 7 depicts simplified exemplary steps in the physical implementation step 122 depicted in FIG. 1, in accordance with one embodiment of the present invention. FIG. 7 includes similar elements and functions as FIG. 2 with the following exceptions. In contrast to FIG. 2, FIG. 7 depicts that after cell placement, optimization may include estimating 720 the number of a multitude of virtual buffers disposed in each clock tree path and then using that estimated number for each clock tree path to perform AOCV1 validation prior to CTS 230. The multitude of virtual buffers are virtual in the sense that virtual buffers are used only for AOCV1 validation purposes and are not permanently placed in the netlist or design layout database, in contrast to the buffers generated during CTS, which are disposed in the layout database and continue on to later design steps. Running AOCV1 validation prior to CTS optimizes the design more easily and reduces excess pessimism as explained above and provides a better design optimization result after CTS than the technique depicted in FIG. 2.

In one embodiment referring to FIG. 7, CTS 230 generates a new different number of a multitude of buffers disposed in each of the clock tree paths than the number of estimated buffers in step 720. The new different number of a multitude of buffers generated in CTS 230 may be defined to be greater than the number of estimated virtual buffers in step 720, in order to provide a more pessimistic timing test at step 720 than the timing test after CTS 230 at step 740. CTS 230 is followed by clock tree optimization and AOCV2 740, which may perform a second AOCV or AOCV2 after the CTS buffers are placed. The estimated virtual buffers that were used in step 720 may no longer be used in AOCV2 or in the steps following step 720.

The new different number of a multitude of buffers generated in CTS 230 may be defined to be greater than the number of estimated virtual buffers in step 720, in order to provide a more pessimistic timing for AOCV1 validation at step 720 than for AOCV2 validation after CTS 230 at step 740. More pessimistic timing for AOCV1 than for AOCV2 ensures the design may be changed earlier in the design flow if needed to correct timing violations when layout resources are more readily available and so that fewer timing violations will occur at subsequent AOCV2 validation. Post-route optimization may include a third round of AOCV validation called AOCV3 at step 750 to comprehend the effects of new routing and resulting timing changes.

In one embodiment, the design flow for physical implementation 122 may simply include placement and optimization & estimate 720 number of buffers in each clock tree path & AOCV1 validation without the subsequent steps of CTS 230, clock tree optimization 740, routing and post-route optimization 750, and chip finishing 260 and design for manufacturing. Such a shortened design flow for physical implementation 122 may be used when IC subsections, e.g. intellectual property (IP) cells, are designed and verified for timing before being incorporated into a system on a chip (SOC) design.

Figure 8:
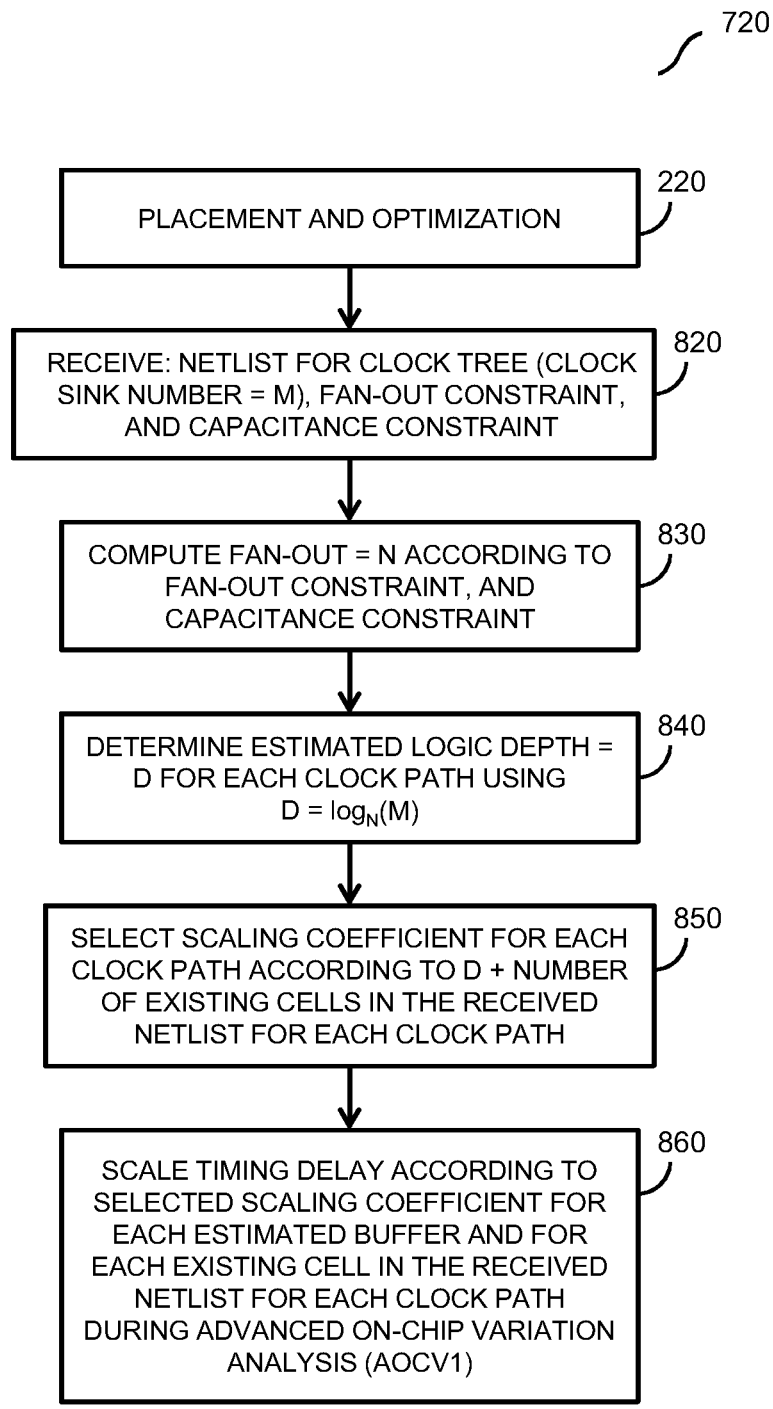
FIG. 8 depicts simplified exemplary steps in the placement and optimization & estimate number of virtual buffers in each clock tree path & AOCV 1 validation step depicted in FIG. 7, in accordance with one embodiment of the present invention.

FIG. 8 depicts simplified exemplary steps in the placement and optimization & estimate number of virtual buffers in each clock tree path & AOCV1 validation 720 depicted in FIG. 7, in accordance with one embodiment of the present invention. Placement and optimization 220 performs the same functions as explained in reference to FIG. 2. After Placement and optimization 220 but before estimating the number of virtual buffers in the clock tree, FIG. 8 depicts receiving a netlist for the clock tree, a fan-out constraint, and a capacitance constraint, which may be based in accordance with technology design rules.

The netlist may, for example, include the schematic for the clock tree and data path 300 depicted in FIG. 3. Referring simultaneously to FIG. 3 and FIG. 8, the simulator may use the netlist to find the clock sink groups and computes the number of clock sinks, M, of each clock sink group. The sink group may be defined as the multitude of circuit blocks receiving the clock signal directly driven by the same clock net, which may be in-turn generated by a clock-buffer circuit reference block (not shown) that generates the clock signal at Clk 320. The sink group name may be the same as the net name. In this example, there are 3 sink groups, CKA, MXA and MXB. Sink group CKA has $M_{CKA}$=1 k sinks included at clock sink 360, sink group MXA has $M_{MXA}$=5 k sinks included at clock sink 380 and sink group MXB has $M_{MXB}$=6 k sinks included at clock sink 390. The netlist further includes electrical and design layout characteristics for the buffer circuit reference block and for one of the multitude of virtual buffers to be used as described below.

The simulator computes 830 a maximum allowable fan-out, N, for the clock-buffer circuit reference block, in accordance with the netlist, the fan-out constraint, and the capacitance constraint. The output load of the clock-buffer circuit reference block may be calculated using a wire load model. Then the simulator determines 840 an estimated logic depth number, D, of the multitude of virtual buffers in accordance with the logarithm of M, the logarithm being to a base equal to N in accordance with the expression $$D=\log_N(M),$$

where N, M, and D are numbers that have integer values each greater than or equal to one. Therefore, in one embodiment, the above expression is evaluated to find the lowest integer value of D that satisfies the formula $$M \leq N^D.$$

Figure 9:
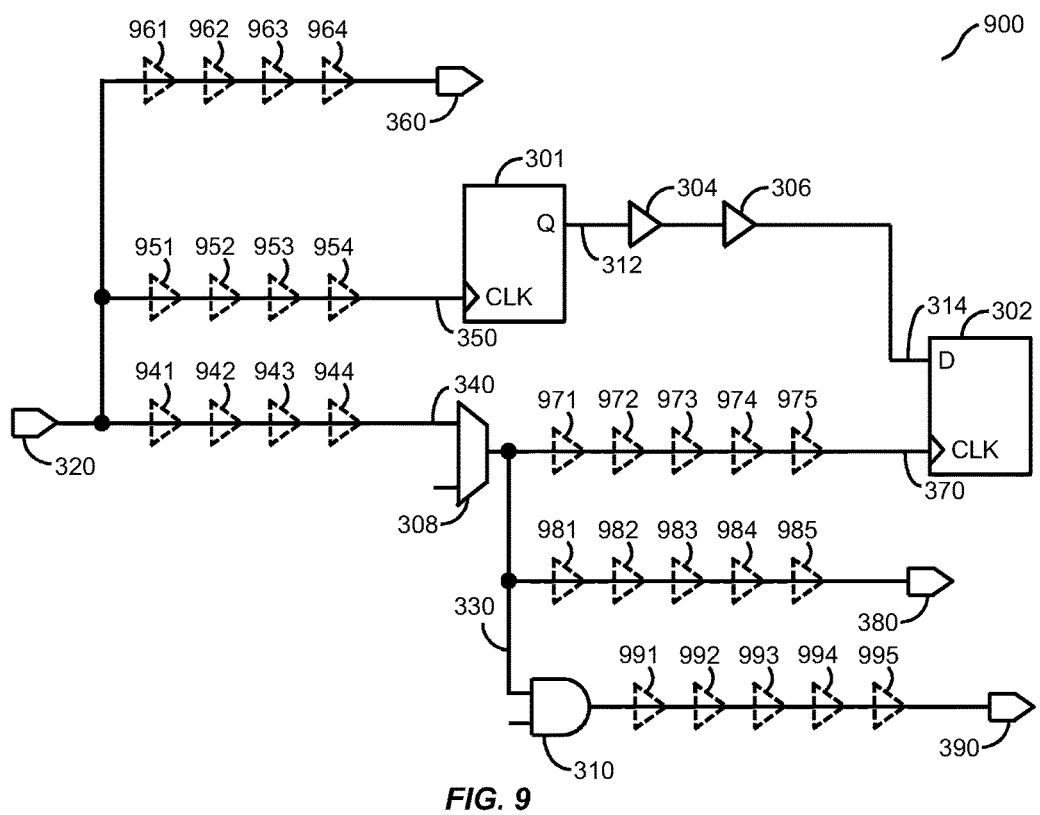
FIG. 9 depicts the simplified exemplary schematic depicted in FIG. 3 after the determined estimated logic depth step depicted in FIG. 8, in accordance with one embodiment of the present invention.

FIG. 9 depicts the simplified exemplary schematic 900 depicted in FIG. 3 after determine estimated logic depth 840 depicted in FIG. 8, in accordance with one embodiment of the present invention. Referring simultaneously to FIG. 8 and FIG. 9 in this example, it is assumed that the maximum allowable fan-out, N, is equal to 8. Therefore, for sink group CKA with $M_{CKA}$ equal to 1 k or 1024 sinks, the evaluation of $D_{CKA}$ uses $$1024 \leq 8^D.$$

It is estimated that $8^3$=512, which is less than 1024 so $D_{CKA}$ must be greater than 3, while $8^4$=4096 which is greater than 1024 so $D_{CKA}$ equal to 4 satisfies the required formulation for $D_{CKA}$. Therefore, the number of estimated virtual buffers to be added to each path in sink group CKA may be four buffers. Similarly, the simulator estimates for sink group MXA with $M_{MXA}$ equal to 5 k or 5120 sinks and for sink group MXB with $M_{MXB}$ equal to 6 k or 6144, that that $8^4$=4096, which is less than 5120 or 6144 so $D_{MXA}$ and $D_{MXB}$ must be greater than 4, while $8^5$=32,768, which is greater than 5120 or 6144 so $D_{MXA}$ equal to $D_{MXB}$ equal to 5 satisfies the required formulation for both $D_{MXA}$ and $D_{MXB}$. Therefore, the number of estimated virtual buffers to be added to each path in both sink group MXA and MXB may be five buffers.

FIG. 9 includes the same elements and functions as FIG. 3 except for the following differences. In accordance with the above logarithmic formulation providing $D_{CKA}$ equal to four, schematic 900 depicted in FIG. 9 may further include disposed at each of the three clock tree paths in sink group CKA, four serially-connected virtual buffers, 941-944, 951-954, 961-964 respectively coupled at each of the three paths between Clk 320 and MUX input 340, between Clk 320 and FF1/CLK 350, and between Clk 320 and clock sink 360.

In accordance with the above logarithmic formulation providing $D_{MXA}$ equal to five, schematic 900 may further include disposed at each of the two clock tree paths in sink group MXA, five serially-connected virtual buffers, 971-975, 981-985 respectively coupled at the two paths between MUX output 330 and FF2/CLK 370, and between MUX output 330 and clock sink 380. In accordance with the above logarithmic formulation providing $D_{MXB}$ equal to five, schematic 900 may further include disposed at the single clock tree path in sink group MXB, five serially-connected virtual buffers, 991-995, coupled between the output of AND gate 310 and clock sink 390.

Virtual buffers are depicted as dashed lines overlapping the uninterrupted clock tree paths without breaking the clock tree path to indicate that virtual buffers are not added to the netlist or design layout, in contrast to the clock tree buffers generated during CTS. Further, in one embodiment, each of the virtual buffers 941-944, 951-954, 961-964, 971-975, 981-985, 991-995 may be chosen to have the same electrical and design layout characteristics of a single type of buffer chosen from the netlist. For example, each of the virtual buffers may be of a type representing a buffer with an amount of electrical drive capability substantially equal to the average of all the different buffer drives available in the cell library associated with the netlist. In one embodiment, the virtual buffers may be associated with a substantially equal delay time.

In contrast, the buffers generated during CTS, such as 641-645, 651-655, 661-665, 671-676, 681-686, 691-696 depicted in FIG. 6, may be chosen from a multitude of different buffer types having different electrical and design layout characteristics chosen from the cell library to better optimize the non-virtual clock-tree drive-solution than a clock-tree drive-solution using a single buffer type. For example, the buffers generated during CTS may include one buffer having a first delay time and another buffer having a second delay time different from the first delay time.

Referring simultaneously to FIG. 8, FIG. 9, and Table 2, after determining 840 the estimated logic depths for each clock path, the simulator selects 850 a scaling coefficient for each clock path in accordance with the value of D determined above plus the number of existing cells in the received netlist for each clock path. Continuing the previous example for the clock tree with virtual buffers, the launch path delay may be represented by Clk 320→U 951→U 952→U 953→U 954→FF1/CLK 350→FF1/Q 312→U 304→U 306→FF2/D 314, It is assumed for this example that each virtual buffer delay is equal to 0.1 ns and that the other circuit block delays may be again be provided by table 1 and are respectively 0.1+0.1+0.1+0.1+0.5+0.11+0.11.

The simulator receives a scaling table, such as for example, Table 2, including a multitude of scaling coefficients or variable derate values each associated with a different one of a multitude of logic depths. The number of estimated virtual buffers in the launch path is $D_{CKA}$ which is equal to four plus the number of existing cells in the launch path of three, e.g. FF1, and pair of buffers 304, 306, bringing the total logic depth to

4+3=7

Next, the simulator may index among the multitude of different logic depths using the logic depth of seven to select the scaling coefficient or variable derating factor of 1.12 that is associated with the logic depth of seven. In this example, the simulator selects the value of 1.12 associated with values of logic depth between five and fourteen, because Table 2 does not explicitly list distinct logic depths from six to fourteen, so the simulator indexes to the next lower listed logic depth below seven, which is five that is explicitly associated with a scaling coefficient of 1.12.

The simulator then scales 860 the timing delay according to the selected scaling coefficient, e.g. 1.12, for each estimated buffer and for each existing cell in the received netlist for each clock path during AOCV1 such as given by for this example the launch path delay may be given by 0.1*1.12+0.1*1.12+0.1*1.12+0.1*1.12+0.5*1.12+0.11*1.12+0.11*1.12=1.2544 ns.

The capture path delays may be represented by

Clk 320→U 941→U 942→U 943→U 944→MUX 308→U 971→U 972→U 973→U 974→U 975→FF2/CLK 370→FF2/D 314,

It is recalled that the clock period and setup time are not scaled by the scaling coefficient because clock period and setup time are not statistically influenced in AOCV analysis. Then the delay times scaled by the 1.12 and assuming the same 4 ns clock period and FF2 setup time shown in Table 1 gives the late arrival time formulation of 4+0.1*1.12+0.1*1.12+0.1*1.12+0.1*1.12+1.0*1.12+ 0.1*1.12+0.1*1.12+0.1*1.12+0.1*1.12+0.1*1.12− 0.21=5.918 ns.

The AOCV1 pre-CTS setup slack is then given by 5.918−1.2544=4.6636 ns, which is greater than zero and thus satisfies the late arrival and slack requirements. It is noted that the setup slack time, margin, or pessimism from AOCV1=4.6636 ns is greater than the setup pessimism from AOCV2=4.1036 ns after CTS as derived above in reference to FIG. 6. Having the pessimism be higher during AOCV1 helps ensure design changes necessitated by timing violations are easier to accomplish before CTS and reduces the number of timing violations after CTS, which helps ensure faster design closure.

Figure 10:
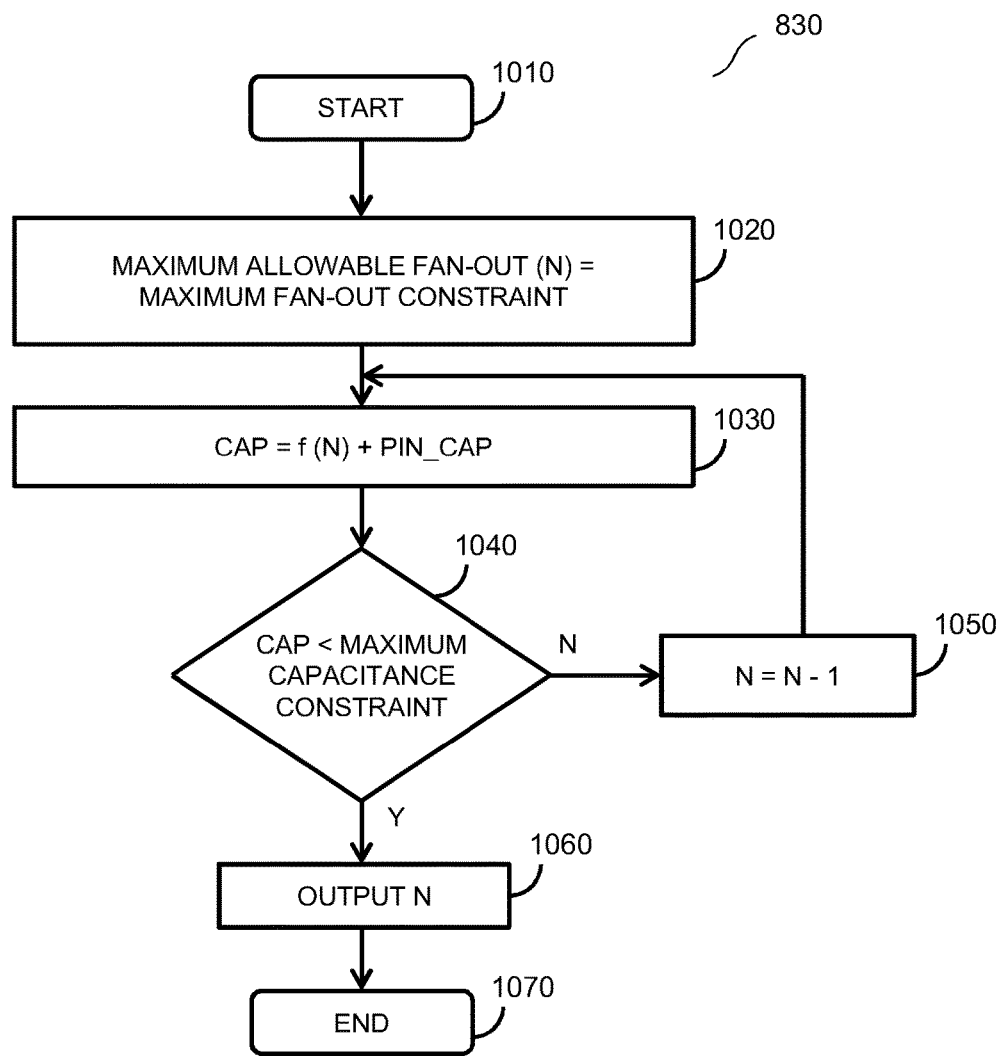
FIG. 10 depicts simplified exemplary steps in the compute fan-out step depicted in FIG. 8, in accordance with one embodiment of the present invention.

FIG. 10 depicts simplified exemplary steps in the compute fan-out 830 step depicted in FIG. 8, in accordance with one embodiment of the present invention. The simulator starts 1010 with setting the maximum allowable fan-out, N, for the clock-buffer circuit reference block (not shown) that generates the clock signal at Clk 320 equal to the received maximum fan-out constraint. Next, the capacitance of the load for the clock-buffer circuit reference block is set 1030 equal to a function of N plus the pin capacitance. If 1040 the capacitance of the load is less than the received maximum capacitance constraint, then the N is output 1060 ending 1070 the computation for N. If 1040 the capacitance of the load is not less than the received maximum capacitance constraint, then N is decremented 1050 by 1, i.e.

$N=N-1$, and the capacitance of the load is recalculated in accordance with the new value of N as a function of N plus the pin capacitance repeating steps 1030-1050 until the capacitance of the load is less than the received maximum capacitance constraint.

Figure 11:
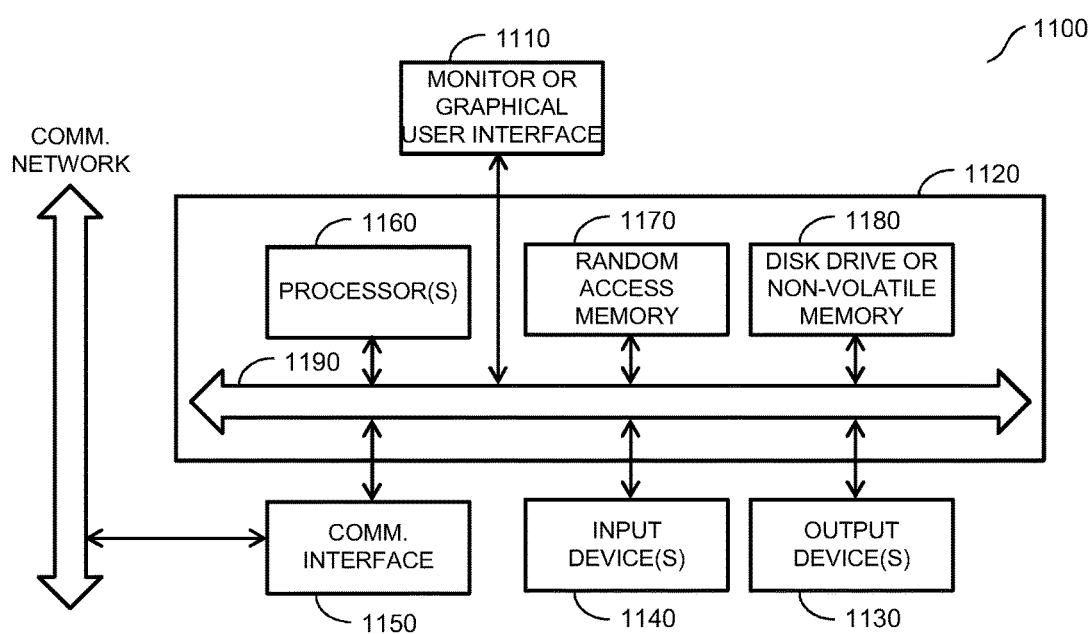
FIG. 11 depicts a block diagram of a computer system that may incorporate embodiments of the present invention.

FIG. 11 depicts a block diagram of a computer system that may incorporate embodiments of the present invention. FIG. 11 is merely illustrative of an embodiment incorporating the present invention and does not limit the scope of the invention as recited in the claims. One of ordinary skill in the art would recognize other variations, modifications, and alternatives.

In one embodiment, computer system 1100 typically includes a monitor 1110, a computer 1120, user output devices 1130, user input devices 1140, communications interface 1150, and the like.

As shown in FIG. 11, computer 1120 may include a processor(s) 1160 that communicates with a number of peripheral devices via a bus subsystem 1190. These peripheral devices may include user output devices 1130, user input devices 1140, communications interface 1150, and a storage subsystem, such as random access memory (RAM) 1170 and disk drive 1180.

User input devices 1130 include all possible types of devices and mechanisms for inputting information to computer system 1120. These may include a keyboard, a keypad, a touch screen incorporated into the display, audio input devices such as voice recognition systems, microphones, and other types of input devices. In various embodiments, user input devices 1130 are typically embodied as a computer mouse, a trackball, a track pad, a joystick, wireless remote, drawing tablet, voice command system, eye tracking system, and the like. User input devices 1130 typically allow a user to select objects, icons, text and the like that appear on the monitor 1110 via a command such as a click of a button or the like.

User output devices 1140 include all possible types of devices and mechanisms for outputting information from computer 1120. These may include a display (e.g., monitor 1110), non-visual displays such as audio output devices, etc.

Communications interface 1150 provides an interface to other communication networks and devices. Communications interface 1150 may serve as an interface for receiving data from and transmitting data to other systems. Embodiments of communications interface 1150 typically include an Ethernet card, a modem (telephone, satellite, cable, ISDN), (asynchronous) digital subscriber line (DSL) unit, FireWire interface, USB interface, and the like. For example, communications interface 1150 may be coupled to a computer network, to a FireWire bus, or the like. In other embodiments, communications interfaces 1150 may be physically integrated on the motherboard of computer 1120, and may be a software program, such as soft DSL, or the like.

In various embodiments, computer system 1100 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiment, computer 1120 includes one or more Xeon microprocessors from Intel as processor(s) 1160. Further, one embodiment, computer 1120 includes a UNIX-based operating system.

RAM 1170 and disk drive 1180 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, non-transitory read-only-memories (ROMS), battery-backed volatile memories, networked storage devices, and the like. RAM 1170 and disk drive 1180 may be configured to store the basic programming and data constructs that provide the functionality of the present invention.

Software code modules and instructions that provide the functionality of the present invention may be stored in RAM 1170 and disk drive 1180. These software modules may be executed by processor(s) 1160. RAM 1170 and disk drive 1180 may also provide a repository for storing data used in accordance with the present invention.

RAM 1170 and disk drive 1180 may include a number of memories including a main random access memory (RAM) for storage of instructions and data during program execution and a read only memory (ROM) in which fixed non-transitory instructions are stored. RAM 1170 and disk drive 1180 may include a file storage subsystem providing persistent (non-volatile) storage for program and data files. RAM 1170 and disk drive 1180 may also include removable storage systems, such as removable flash memory.

Bus subsystem 1190 provides a mechanism for letting the various components and subsystems of computer 1120 communicate with each other as intended. Although bus subsystem 1190 is shown schematically as a single bus, alternative embodiments of the bus subsystem may utilize multiple busses.

FIG. 11 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of the present invention can be implemented in the form of logic in software or hardware or a combination of both. The logic may be stored in a computer readable or machine-readable non-transitory storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

The above embodiments of the present invention are illustrative and not limiting. Various alternatives and equivalents are possible. Although, the invention has been described with reference to a particular design flow using AOCV timing validation by way of an example, it is understood that the invention is not limited by the type of timing analysis used but may also be applicable to other forms of timing analysis that may benefit by estimating the logic depth of a signal path during validation. Although, the invention has been described with reference to a particular design flow using CTS by way of an example, it is understood that the invention is not limited by the type of design flow used but may also be applicable to other design flows that may benefit by estimating the logic depth of a signal path during validation. Although, the invention has been described with reference to an exemplary clock tree circuit by way of an example, it is understood that the invention is not limited by the type of tree circuit so long as the design flow may benefit from an estimation of a buffer network to be instantiated later in the tree circuit design. In addition, the technique and system of the present invention is suitable for use with a wide variety of electronic design automation (EDA) tools and methodologies for designing, testing, and/or manufacturing systems characterized by a combination of conserved, signal flow, and event or digital system of equations. The scope of the invention should, therefore, be determined not with reference to the above description, but instead should be determined with reference to the pending claims along with their full scope or equivalents.

What is claimed is:

1. A computer implemented method for validating a clock tree, the method comprising:
    estimating a first number of a plurality of first buffers disposed in the clock tree path;
    selecting a first scaling coefficient in accordance with the first number;
    scaling a first delay associated with the plurality of first buffers in accordance with the selected first scaling coefficient; and
    generating a second plurality of second buffers disposed in the clock tree path defined by a second number greater than the first number.

2. The method of claim 1, wherein generating the second plurality of second buffers is performed after scaling the first delay.

3. The method of claim 1, wherein the plurality of first buffers is coupled between a first block generating a clock signal in the clock tree and a third number of a plurality of second blocks receiving the clock signal.

4. The method of claim 3, wherein estimating the first number is in accordance with a logarithmic function of the third number.

5. The method of claim 3, wherein estimating the first number includes:
    receiving, before estimating the first number, a netlist for the clock tree, a fan-out constraint, and a capacitance constraint;
    computing a first fan-out in accordance with the netlist, the fan-out constraint, and the capacitance constraint; and
    determining the first number in accordance with the logarithm of the third number, the logarithm being to a base equal to the first fan-out.

6. The method of claim 1, wherein each one of the plurality of first buffers is associated with a substantially equal delay time.

7. The method of claim 1, wherein the plurality of second buffers includes:
    a third buffer having a first delay time; and
    a fourth buffer having a second delay time different from the first delay time.

8. The method of claim 1 further comprising:
    selecting, after scaling the first delay, a second scaling coefficient smaller than the first scaling coefficient in accordance with the second number; and
    scaling a second delay associated with the plurality of second buffers in accordance with the selected second scaling coefficient.

9. The method of claim 1, wherein selecting the first scaling coefficient includes:
    receiving a scaling table including a plurality of scaling coefficients each associated with a different one of a plurality of logic depths including the first number; and
    indexing among the plurality of logic depths using the first number to select the first scaling coefficient that is associated with the first number.

10. A computer implemented method for validating a clock tree, the method comprising:
    estimating a first number of a plurality of first buffers disposed in the clock tree path, wherein the plurality of first buffers is coupled between a first block generating a clock signal in the clock tree and a second number of a plurality of second blocks receiving the clock signal, wherein estimating the first number is in accordance with a logarithmic function of the second number;
    selecting a first scaling coefficient in accordance with the first number; and
    scaling a first delay associated with the plurality of first buffers in accordance with the selected first scaling coefficient.

11. The method of claim 10, wherein estimating the first number further includes:
    receiving, before estimating the first number, a netlist for the clock tree, a fan-out constraint, and a capacitance constraint;
    computing a first fan-out in accordance with the netlist, the fan-out constraint, and the capacitance constraint; and
    determining the first number in accordance with the logarithm of the third number, the logarithm being to a base equal to the first fan-out.

12. The method of claim 10, wherein each one of the plurality of first buffers is associated with a substantially equal delay time.

13. The method of claim 10, wherein selecting the first scaling coefficient further includes:
    receiving a scaling table including a plurality of scaling coefficients each associated with a different one of a plurality of logic depths including the first number; and
    indexing among the plurality of logic depths using the first number to select the first scaling coefficient that is associated with the first number.

14. A system for validating a clock tree configured to:
    estimate a first number of a plurality of first buffers disposed in the clock tree path;
    select a first scaling coefficient in accordance with the first number;
    scale a first delay associated with the plurality of first buffers in accordance with the selected first scaling coefficient; and
    generate a second plurality of second buffers disposed in the clock tree path defined by a second number greater than the first number.

15. The system of claim 14 further configured to generate the second plurality of second buffers after scaling the first delay.

16. The system of claim 14, wherein the plurality of first buffers is coupled between a first block that generates a clock signal in the clock tree and a third number of a plurality of second blocks that receive the clock signal.

17. The system of claim 16 further configured to estimate the first number in accordance with a logarithmic function of the third number.

18. The system of claim 16 further configured to:
    receive, before estimating the first number, a netlist for the clock tree, a fan-out constraint, and a capacitance constraint;
    compute a first fan-out in accordance with the netlist, the fan-out constraint, and the capacitance constraint; and determine the first number in accordance with the logarithm of the third number, the logarithm being to a base equal to the first fan-out.

19. The system of claim 14, wherein each one of the plurality of first buffers is associated with a substantially equal delay time.

20. The system of claim 14, wherein the plurality of second buffers includes:
a third buffer having a first delay time; and
a fourth buffer having a second delay time different from the first delay time.

21. The system of claim 14 further configured to:
select, after the first delay is scaled, a second scaling coefficient smaller than the first scaling coefficient in accordance with the second number; and
scale a second delay associated with the plurality of second buffers in accordance with the selected second scaling coefficient.

22. The system of claim 14 further configured to:
receive a scaling table including a plurality of scaling coefficients each associated with a different one of a plurality of logic depths including the first number; and
index among the plurality of logic depths using the first number to select the first scaling coefficient that is associated with the first number.

23. A system for validating a clock tree configured to:
estimate a first number of a plurality of first buffers disposed in the clock tree path, wherein the plurality of first buffers is coupled between a first block generating a clock signal in the clock tree and a second number of a plurality of second blocks receiving the clock signal, wherein the first number is estimated in accordance with a logarithmic function of the second number;
select a first scaling coefficient in accordance with the first number; and
scale a first delay associated with the plurality of first buffers in accordance with the selected first scaling coefficient.

24. The system of claim 23 further configured to:
receive, before the first number is estimated, a netlist for the clock tree, a fan-out constraint, and a capacitance constraint;
compute a first fan-out in accordance with the netlist, the fan-out constraint, and the capacitance constraint; and
determine the first number in accordance with the logarithm of the third number, the logarithm being to a base equal to the first fan-out.

25. The system of claim 23, wherein each one of the plurality of first buffers is associated with a substantially equal delay time.

26. The system of claim 23 further configured to:
receive a scaling table including a plurality of scaling coefficients each associated with a different one of a plurality of logic depths including the first number; and
index among the plurality of logic depths using the first number to select the first scaling coefficient that is associated with the first number.

27. A non-transitory computer-readable storage medium comprising instructions, which when executed by a computer, cause the computer to:
estimate a first number of a plurality of first buffers disposed in the clock tree path;
select a first scaling coefficient in accordance with the first number;
scale a first delay associated with the plurality of first buffers in accordance with the selected first scaling coefficient; and
generate a second plurality of second buffers disposed in the clock tree path defined by a second number greater than the first number.

28. The non-transitory computer-readable storage medium of claim 27, the instructions further causing the computer to generate the second plurality of second buffers after scaling the first delay.

29. The non-transitory computer-readable storage medium of claim 27, wherein the plurality of first buffers is coupled between a first block that generates a clock signal in the clock tree and a third number of a plurality of second blocks that receive the clock signal.

30. The non-transitory computer-readable storage medium of claim 29, the instructions further causing the computer to estimate the first number in accordance with a logarithmic function of the third number.

31. The non-transitory computer-readable storage medium of claim 29, the instructions further causing the computer to:
receive, before estimating the first number, a netlist for the clock tree, a fan-out constraint, and a capacitance constraint;
compute a first fan-out in accordance with the netlist, the fan-out constraint, and the capacitance constraint; and
determine the first number in accordance with the logarithm of the third number, the logarithm being to a base equal to the first fan-out.

32. The non-transitory computer-readable storage medium of claim 27, wherein each one of the plurality of first buffers is associated with a substantially equal delay time.

33. The non-transitory computer-readable storage medium of claim 27, wherein the plurality of second buffers includes:
a third buffer having a first delay time; and
a fourth buffer having a second delay time different from the first delay time.

34. The non-transitory computer-readable storage medium of claim 27 the instructions further causing the computer to:
select, after the first delay is scaled, a second scaling coefficient smaller than the first scaling coefficient in accordance with the second number; and
scale a second delay associated with the plurality of second buffers in accordance with the selected second scaling coefficient.

35. The non-transitory computer-readable storage medium of claim 27, the instructions further causing the computer to:
receive a scaling table including a plurality of scaling coefficients each associated with a different one of a plurality of logic depths including the first number; and
index among the plurality of logic depths using the first number to select the first scaling coefficient that is associated with the first number.

36. A non-transitory computer-readable storage medium comprising instructions, which when executed by a computer, cause the computer to:
estimate a first number of a plurality of first buffers disposed in the clock tree path, wherein the plurality of first buffers is coupled between a first block generating a clock signal in the clock tree and a second number of a plurality of second blocks receiving the clock signal, wherein the first number is estimated in accordance with a logarithmic function of the second number;
select a first scaling coefficient in accordance with the first number; and scale a first delay associated with the plurality of first buffers in accordance with the selected first scaling coefficient.

37. The non-transitory computer-readable storage medium of claim 36, the instructions further causing the computer to:
receive, before the first number is estimated, a netlist for the clock tree, a fan-out constraint, and a capacitance constraint;
compute a first fan-out in accordance with the netlist, the fan-out constraint, and the capacitance constraint; and
determine the first number in accordance with the logarithm of the third number, the logarithm being to a base equal to the first fan-out.

38. The non-transitory computer-readable storage medium of claim 36, wherein each one of the plurality of first buffers is associated with a substantially equal delay time.

39. The non-transitory computer-readable storage medium of claim 36, the instructions further causing the computer to:
receive a scaling table including a plurality of scaling coefficients each associated with a different one of a plurality of logic depths including the first number; and
index among the plurality of logic depths using the first number to select the first scaling coefficient that is associated with the first number.

* * * * *